(12) United States Patent
Hildebrandt et al.

(10) Patent No.: US 8,221,296 B2
(45) Date of Patent: Jul. 17, 2012

(54) IMPLEMENT CLAMPING SYSTEM

(75) Inventors: Dietmar Hildebrandt, Trier (DE); Hans Stolzenberg, Korschenbroich (DE)

(73) Assignee: Forkardt Deutschland GmbH, Erkrath (DE)

( * ) Notice: Subject to any disclaimer, the term of this patent is extended or adjusted under 35 U.S.C. 154(b) by 1086 days.

(21) Appl. No.: 11/994,570

(22) PCT Filed: Jul. 3, 2006

(86) PCT No.: PCT/IB2006/001838
§ 371 (c)(1),
(2), (4) Date: Jan. 18, 2008

(87) PCT Pub. No.: WO2007/004039
PCT Pub. Date: Jan. 11, 2007

(65) Prior Publication Data
US 2008/0217871 A1    Sep. 11, 2008

(30) Foreign Application Priority Data

Jul. 4, 2005    (DE) .................. 10 2005 031 142

(51) Int. Cl.
*B23B 31/39*    (2006.01)
(52) U.S. Cl. ........... 483/20; 279/110; 279/124; 279/901
(58) Field of Classification Search ............ 483/20; 279/110, 124, 901; *B23B 31/39*
See application file for complete search history.

(56) References Cited

U.S. PATENT DOCUMENTS

| | | | | |
|---|---|---|---|---|
| 3,744,125 A * | 7/1973 | Schalles | ............ | 483/20 |
| 4,100,671 A * | 7/1978 | Junike et al. | ............ | 483/20 |
| 4,313,252 A * | 2/1982 | Kuska et al. | ............ | 483/20 |
| 4,532,692 A * | 8/1985 | Miyachi | ............ | 483/13 |
| 4,587,708 A * | 5/1986 | Miyachi | ............ | 483/20 |
| 4,641,414 A * | 2/1987 | Hiestand | ............ | 483/20 |
| 4,644,636 A * | 2/1987 | Link et al. | ............ | 483/20 |
| 4,648,170 A * | 3/1987 | Kempken et al. | ............ | 483/20 |
| 4,722,536 A * | 2/1988 | Lane et al. | ............ | 279/123 |
| 4,725,065 A * | 2/1988 | Hiestand | ............ | 279/123 |
| 4,763,906 A * | 8/1988 | Barbieux | ............ | 279/123 |
| 4,821,402 A * | 4/1989 | Kosho et al. | ............ | 483/5 |
| 4,946,177 A * | 8/1990 | Barbieux | ............ | 279/123 |
| 5,033,183 A * | 7/1991 | Morisaki | ............ | 483/20 |
| 5,735,534 A * | 4/1998 | Edwards | ............ | 279/124 |
| 5,842,705 A * | 12/1998 | Tabachenko et al. | ............ | 279/124 |
| 6,241,261 B1 * | 6/2001 | Rehm | ............ | 279/124 |
| 6,264,210 B1 * | 7/2001 | Difasi et al. | ............ | 279/124 |
| 7,594,665 B2 * | 9/2009 | Crowley et al. | ............ | 279/109 |

FOREIGN PATENT DOCUMENTS

| | | |
|---|---|---|
| DE | 3528943 C1 | 1/1987 |
| DE | 3603459 A1 * | 8/1987 |
| DE | 101 44 753 A1 | 7/2003 |
| JP | 02237704 A * | 9/1990 |

OTHER PUBLICATIONS

ISR for PCT/IB2006/001838 mailed Jan. 3, 2007.

* cited by examiner

*Primary Examiner* — Eric A Gates
(74) *Attorney, Agent, or Firm* — Lowe Hauptman Ham & Berner LLP

(57) ABSTRACT

A base jaw and a top jaw of an implement clamping system, which can be plugged into each other and which comprise engaging surfaces configured together into cuneal manner and limiting the depth of penetration between the two jaws. The wedge angle is at least 85° or more, but at most 140°, thereby substantially avoiding jamming the engaging surfaces while nevertheless the top jaws are held in place in all directions by the base jaws.

14 Claims, 7 Drawing Sheets

Figure 1:
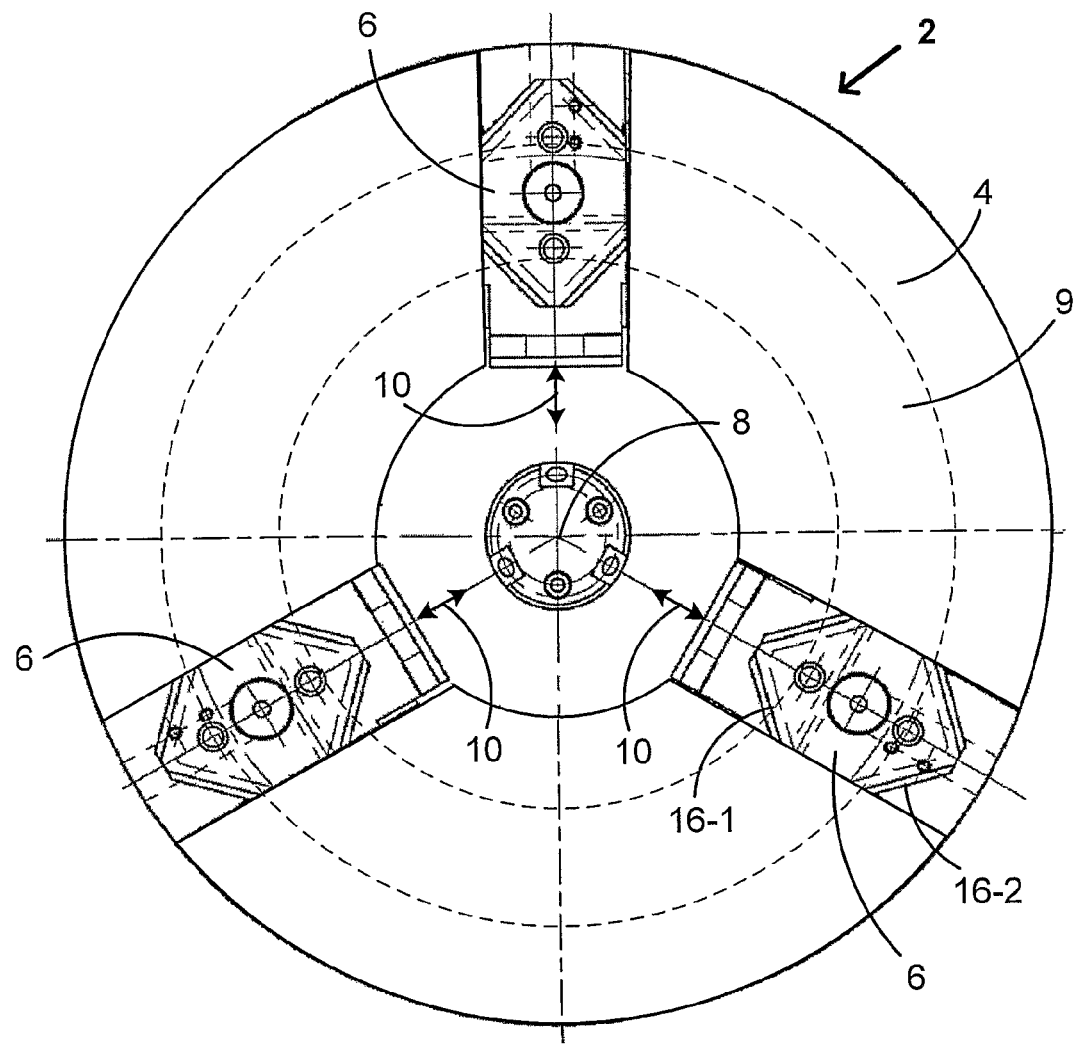

IMPLEMENT CLAMPING SYSTEM

RELATED APPLICATIONS

The present application is based on International Application Number PCT/IB2006/001838 filed Jul. 3, 206, and claims priority from German Application Number 10 2005 031 142.3 filed Jul. 4, 2005, the disclosures of which are hereby incorporated by reference herein in their entirety.

The present invention relates to an implement clamping system, i.e. to a system holding a tool or a workpiece, and to base jaws and top jaws for such a system as defined in the patent claims.

Implement clamping systems may be powered manually or preferably electrically, pneumatically or hydraulically. Implement clamping systems may be made in different designs, in particular in the form of chucks or systems tailored to given applications.

Base jaws and top jaws for implement clamping systems are known from the German patent document DE 101 44 753 A1. The base jaw and the top jaw are cuneal plug-in connector elements. The angle subtended between the two wedge sides is not defined in this document. Its drawings show a wedge angle of 40°. This is the same 40° wedge angle as designed into the base jaws and top jaws produced by the patent owner.

The objective of the present invention is to so design the base jaw and the top jaw that the latter shall be affixable to and detachable from the former more easily and more rapidly, for instance a new top jaw being exchanged for a previous one.

This problem is solved by the present invention in that the wedge angle between the cuneal operating surfaces of the V-shaped plug-in connector between the base jaw and the top jaw shall be at least 85° or larger but no more than 140°. In one preferred embodiment mode this wedge angle is 90°.

The present invention offers in particular the following advantages over the state of the art:

Reduced tendency to "set" (subsequent deeper mutual penetration of the V-shaped plug-in connector elements) than in the state of the art. No jamming of the top jaw on the base jaw or at least substantial reduction in such jamming relative to the state of the art. Lesser tendency of warping of the top jaw on the base jaw than in the state of the art. The feasibility to automatically exchange the top jaws on the base jaws of implement clamping systems—such feasibility being impossible in the state of the art. The invention may be implemented in a way that it shall be applicable alternatively in externally and internally tightening the implement clamping system (clamping a tool or workpiece from the outside or the inside), whereas in the state of the art the top jaws and the base jaws and hence also the implement clamping system are designed exclusively either for external clamping or inside clamping. The accurate manufacture of the base jaws and top jaws is simpler than in the state of the art. Even after substantial length of operation, the invention attains accurate positioning of the top jaw on the base jaw. Exchanging the top jaws on the base jaw of an implement clamping system is simple without entailing crowding problems.

Further features of the present invention are stated in the dependent claims.

Preferably the apex of the wedge angle of the wedge connection between base jaw and top jaw runs in the same direction as the clamping surface fitted on the top jaw. As a result the clamping force of the implement clamping system acts in a direction whereby the engaging surfaces of the plug-in connector are forced against each other. In this manner the dimensional accuracy of the implement clamping system is retained in use because there is no danger that said system's clamping force should separate the engaging surfaces from one another.

The invention also relates to an implement clamping system comprising at least one displaceable base jaw and at least one associated top jaw. Said implement clamping system may be manually operated, preferably however it shall be driven by a power source, and preferably it shall be a chuck. Said system comprises preferably at least two or three base jaws of the present invention which are distributed around a central longitudinal axis (center line). Other embodiment modes of the present invention comprise only one base jaw of said invention which receives a top jaw. Illustratively a clamping jaw may be affixed in place and opposite said top jaw in order to clamp a tool or a workpiece between the clamping jaw and the top jaw.

Moreover the present invention relates to a machine comprising an implement clamping system of the invention and an automated jaw exchanging system to automatically exchange the top jaws with new or other top jaws on the base jaw.

The base jaw of the present invention comprises a V-shaped flange (undercut) receiving the inserted top jaw. This top jaw flange may be used both to tighten a chuck externally and internally. According to a preferred embodiment of the present invention, when inserting the top jaw into this flange, said top jaw is kept by two spring-loaded compression elements in the base jaw and it is locked by a spring-loaded locking bolt entering a central borehole of said top jaw.

When manually separating the top jaw from the base jaw, the locking bolt is unlocked by a tool key which is inserted laterally into the base jaw and then can be rotated therein.

When removing/affixing in automated manner one or more top jaws to/from corresponding chuck base jaws, the top jaws rest on a jaw exchanging device designed in a manner that it can align all chuck top jaws on the chuck base jaws. The jaw exchanging device may be fitted with a transport element or a robot.

Example of a preferred embodiment mode of the present invention:

To receive top jaws, the empty chuck in its open position (the base jaw being in its radially outermost or radially innermost position) is moved axially toward the back jaw exchanging device. Using positioning bolts centering the top jaws onto the jaw exchanging device, the spring actuated locking bolt is pressed back into the chuck's base jaws. Thereupon the power chuck, hereafter power chuck, moves into its closed position or at least in the direction of its closed position. As a result the base jaws each move into the V-shaped flange each into one of the top jaws. Next the power chuck again assumes a position away from the jaw exchanging device. In this manner the positioning bolts of the jaw exchanging device release the spring-driven locking bolts which thereby are moved in spring-driven manner into a locking borehole of the top jaws. In this manner the locking bolts do lock the top jaws onto the base jaws. Henceforth the chuck is operationally ready.

Instead of a chuck powered from a power source, a manually operated chuck or implement clamping system may be used provided they be adapted for a special application to a particular machine.

Further examples:

In one embodiment mode, instead of moving the power chuck in the direction toward the jaw exchanging device, said device instead may be moved toward the power chuck, or both parts may be displaced.

When depositing the top jaws on an empty jaw exchanging device, the opposite procedure is carried out in the reverse order.

Then invention is elucidated below by preferred illustrative embodiment modes and in relation to the appended drawings.

Figure 2:
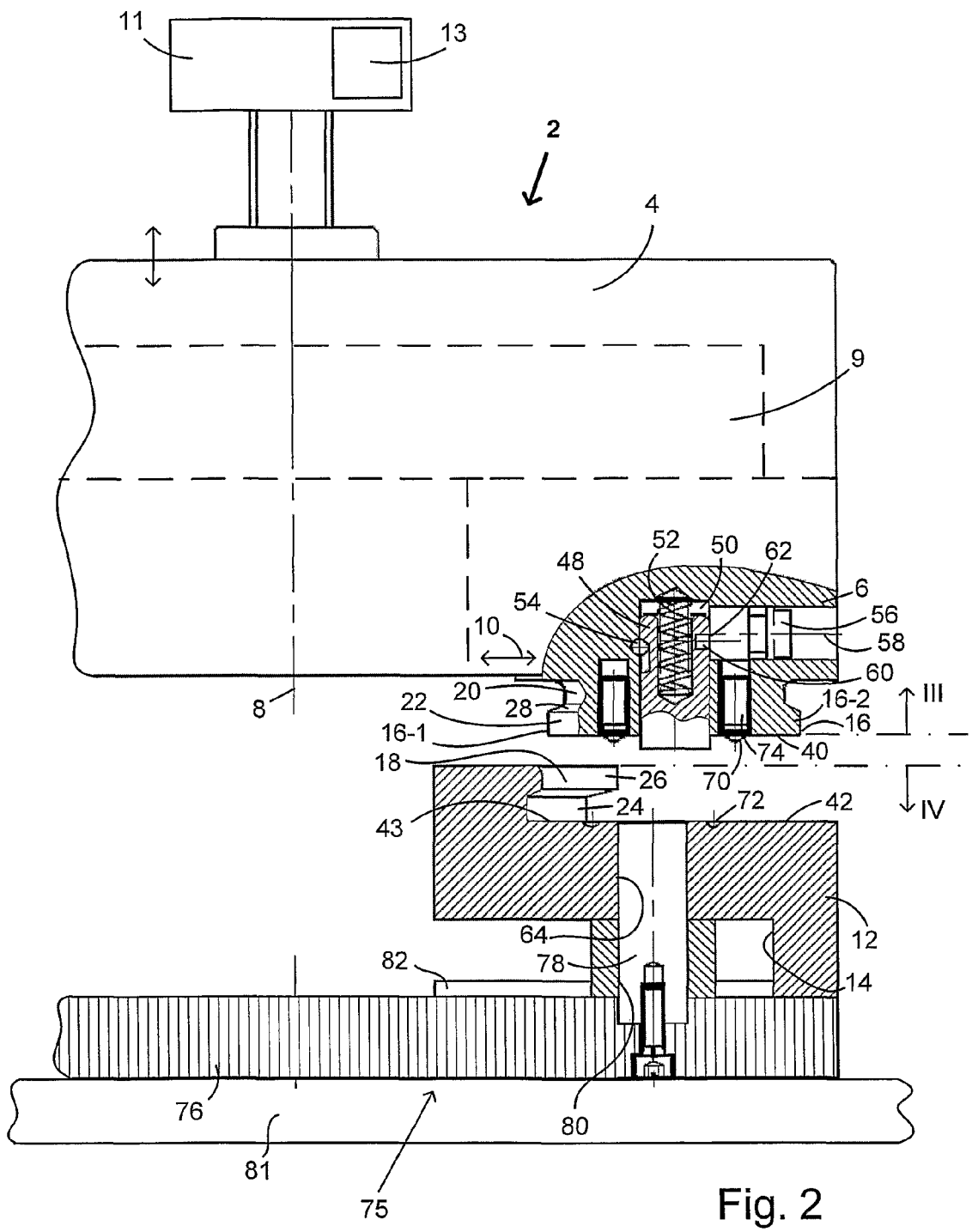
Figure 3:
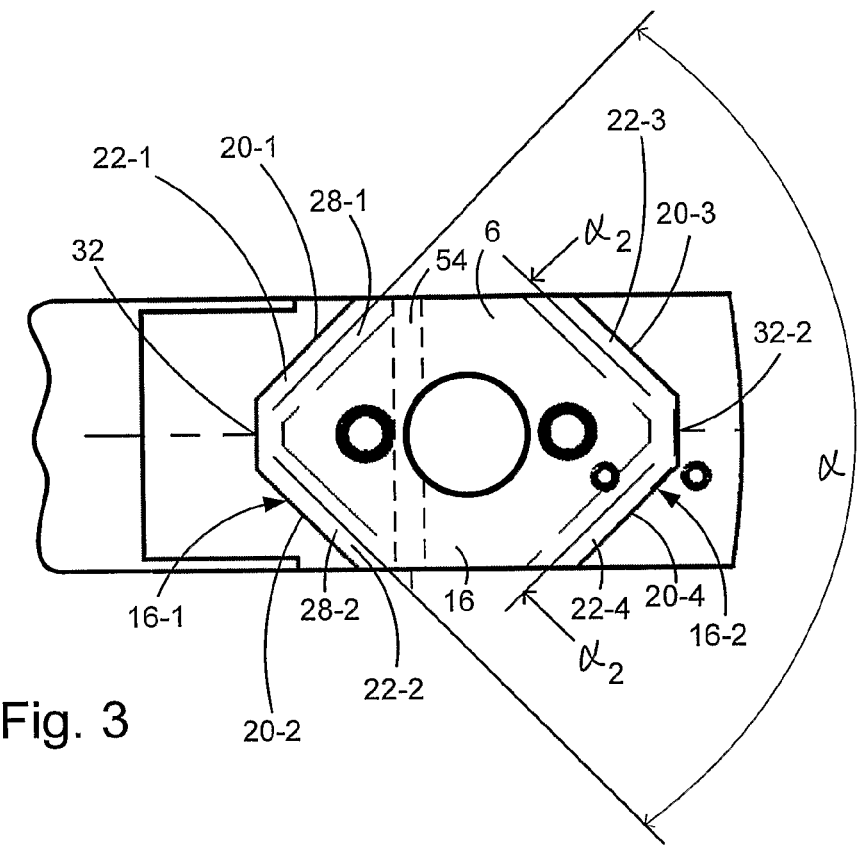
Figure 4:
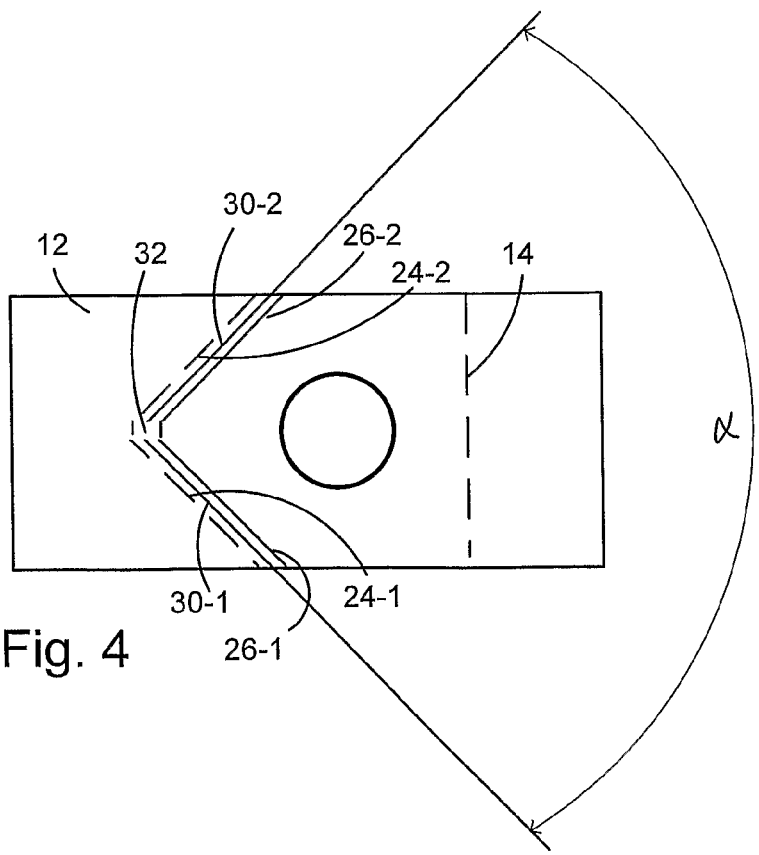
Figure 5:
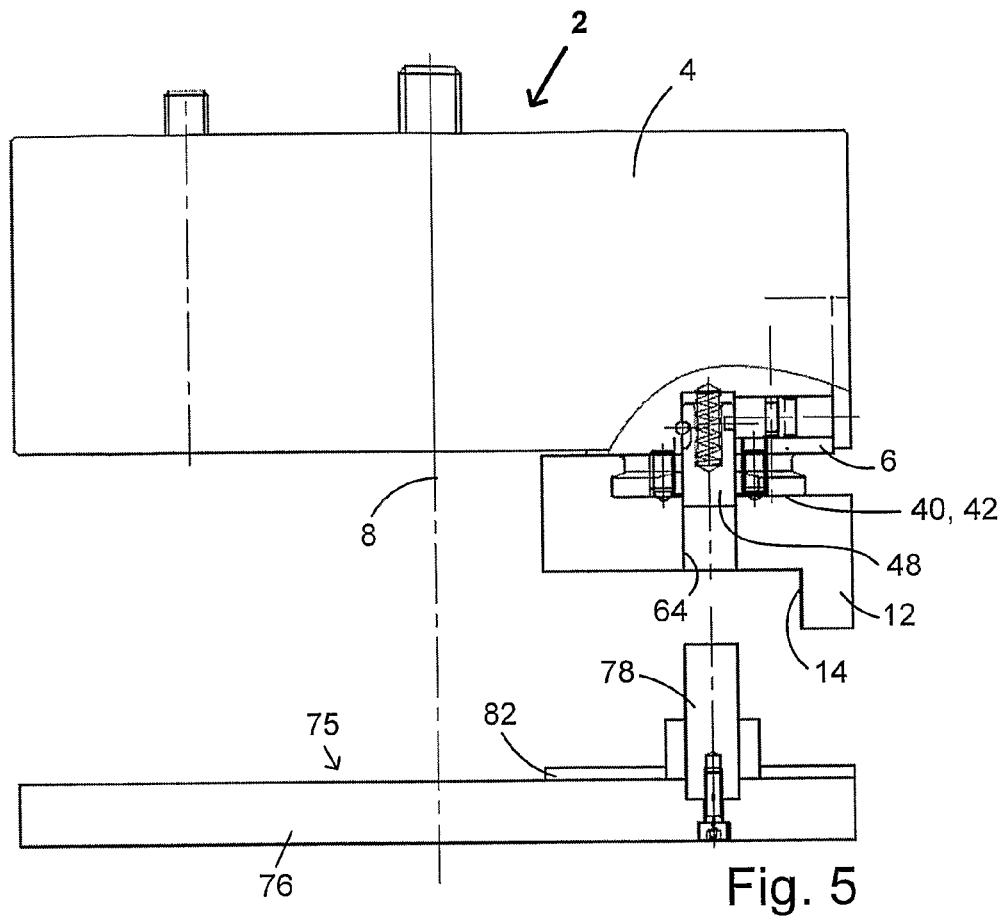
Figure 6:
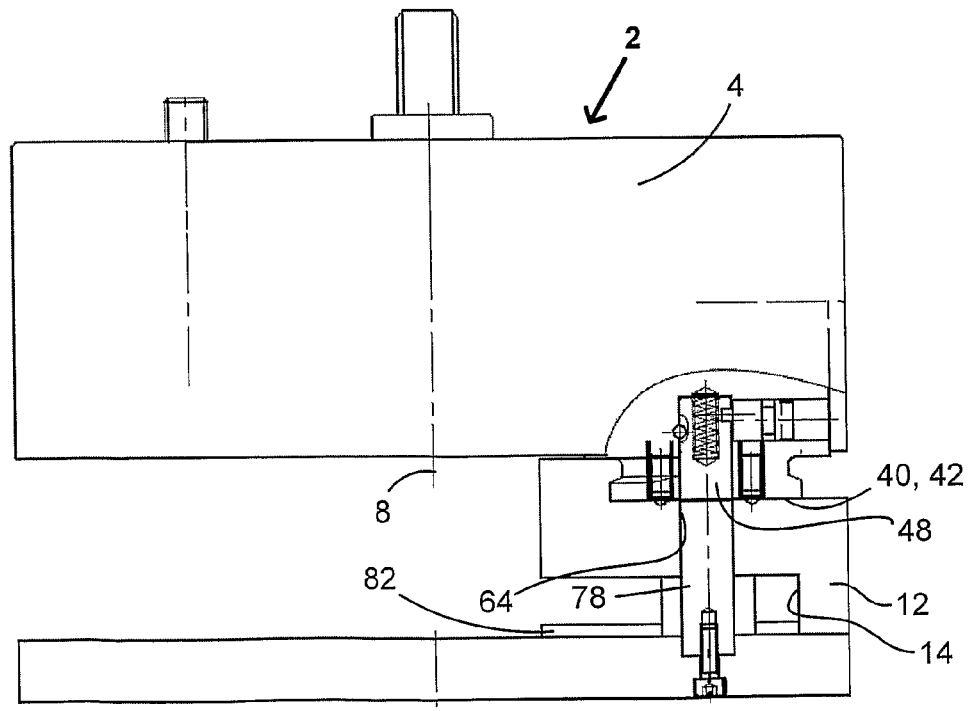
Figure 7:
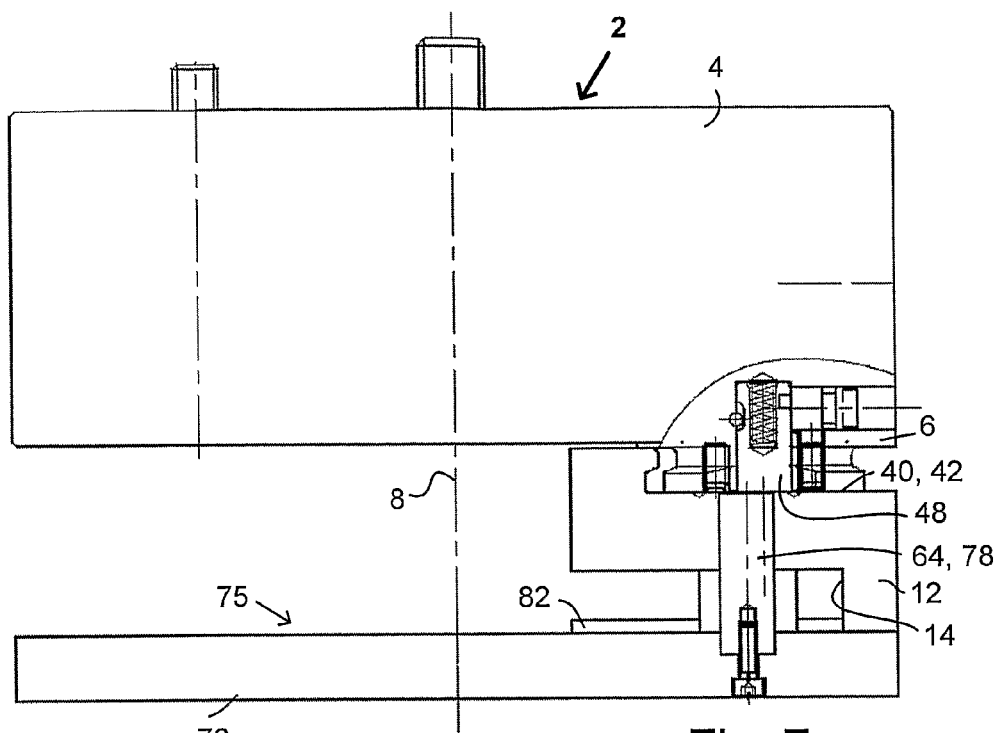
Figure 8:
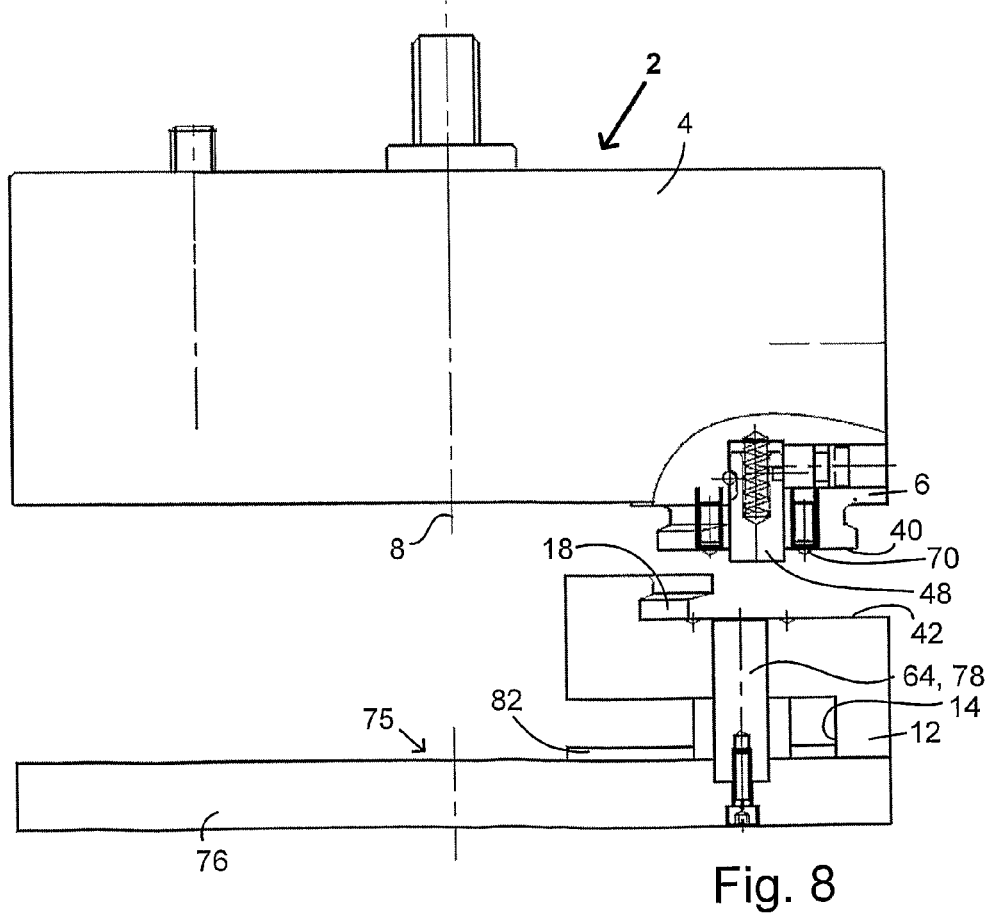
Figure 9:
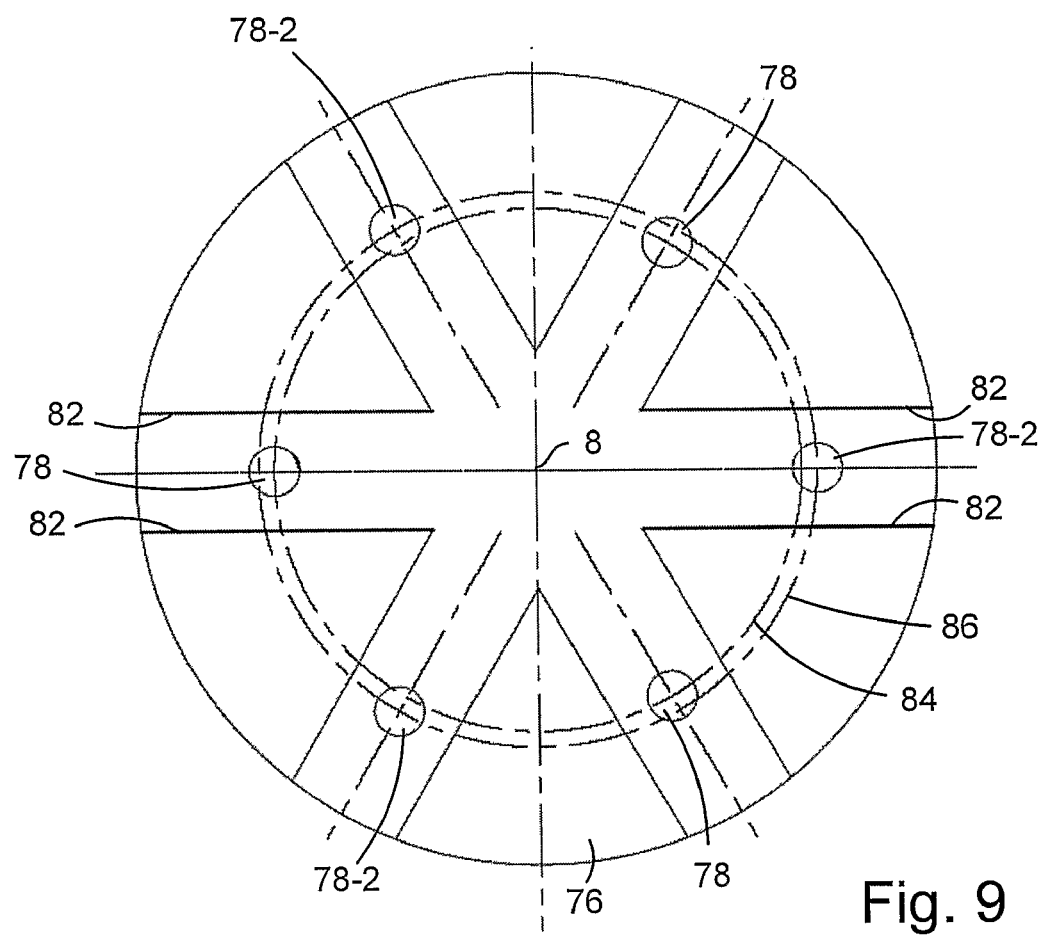
Figure 10:
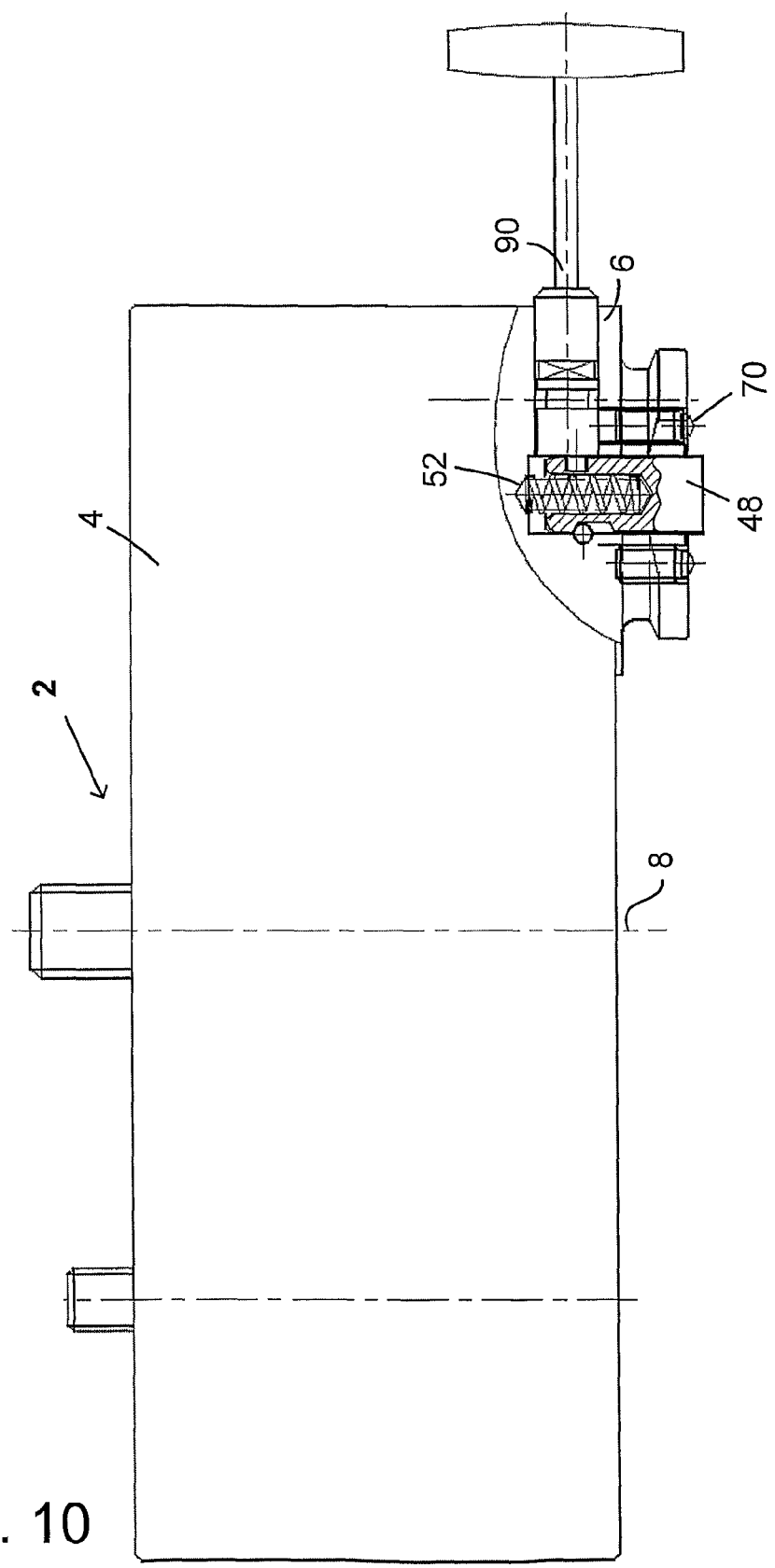

FIG. 1 is a schematic frontview of an implement clamping system of the invention in the form of a power chuck of the invention fitted with base jaws but no top jaws, FIG. 2 is a partial sideview of a machine of the invention shown in longitudinal section and shows a portion of the power chuck of FIG. 1 in combination with a jaw exchanging device, only one base jaw and one top jaw of the various base and top jaws being shown to elucidate affixing and removing top jaws on/from the base jaws, FIG. 3 is an enlarged bottom view of a base jaw of FIGS. 1 and 2 shown in the direction of an arrow III of FIG. 2, FIG. 4 is a topview of a top jaw in the direction of an arrow IV of FIG. 2, FIG. 5 schematically shows a sideview of the machine of FIG. 2, the top jaw being affixed to the base jaw and an empty jaw exchanging device being positioned at an axial distance from the base jaws and in the direction of rotation in a manner that in every instance one positioning bolt of the jaw exchanging device is situated axially opposite to and axially away from a stop aperture of the top jaw, FIG. 6 shows the machine of FIG. 5 after the power chuck has been lowered onto the jaw exchanging device, whereby the positioning bolt of the jaw exchanging device has entered the locking aperture of the added jaw and has expelled the locking bolt out of the locking position into the base jaw, so that hence the base jaw can be moved radially relative to the added jaw and therefore the V-shaped connector between the two jaws can be disengaged, FIG. 7 shows the machine of FIG. 6 following the radial disengaging displacement of the base jaw from the top jaw, so that these jaws now can be moved axially away from each other, FIG. 8 shows the machine of FIG. 7 after the power chuck has been axially moved away from the jaw exchanging device and thereby the added top jaw was axially moved away from the base jaw, FIG. 9 shows an end-face view of the front side—facing the power chuck—of a jaw exchanging device, and FIG. 10 schematically shows the power chuck of FIG. 2 in combination with a key to manually locking/unlocking the locking bolt instead of automatically.

The power chuck 2 of the invention shown in FIG. 1 contains a chuck case 4 and illustratively three base jaws 6. The base jaws 6 are configured equidistantly about a central longitudinal axis 8 (center line) of the power chuck 2. Top jaws 12 can be affixed to the base jaws 6 and are fitted each with at least one clamping surface 14. The base jaws 6 can be radially displaced by a base jaw displacement unit 9 within the chuck case 4 along a rectilinear, radial path denoted by the arrows 10 in order to clamp, between the clamping surfaces 14 of the top jaws 12, a tool (drilling, milling bits etc.) or a workpiece to be treated either radially from the outside (external clamping) or radially from the inside (inner clamping). The power chuck 2 may be a chuck powered to rotate or not about the longitudinal axis 8.

The power chuck 2 is mounted preferably to be axially displaceable relative to the longitudinal axis 8. This displacement may take place manually or preferably by a drive means 11. The power chuck 2 may be mounted irrotationally or be rotatable by a drive means 13, for instance a preferably electric motor, about the longitudinal axis 8.

FIGS. 2 through 10 each show only one base jaw 6 and one top jaw 12 when describing the features and operations of the invention because same are identical for all base and top jaws.

The base jaw 6 and the top jaw 12 always plug into/out of each other radially to the theoretical longitudinal axis 8. The top jaw 12 comprises at least one clamping surface 14 which points toward a radial direction of clamping to clamp a workpiece or a tool between the clamping surfaces 14 of all top jaws 12 of the power chuck 2.

The plug-in connector at the jaw 6 or the jaw 12 is in the form of at least one plug-in element which is fitted with a laterally undercut wedge rib and, at the other particular jaw 12 or jaw 6, with at least one plug-in connection element that is fitted with a laterally undercut wedge slot open at is wider slot end to allow receiving the laterally undercut wedge rib. In the preferred embodiment mode of the invention, the wedge rib 16-1 (and/or 16-2) is constituted at the base jaw 6, and the wedge slot 18 is constituted at the top jaw 12. In another (omitted) embodiment of the invention, however, the wedge rib 16-1 (and/or 16-2) may be constituted in inverted manner at the top jaw 12 and the wedge slot 18 at the base jaw 6.

The two mutually cuneal side walls of the wedge rib 16 and the wedge slot 18 each are fitted with an undercut, as a result of which the sidewalls are fitted with lateral slots 20 and an associated slot rim protrusion 22 in the base jaw 6 and also each with a lateral slot 24 and a slot rim protrusion 26 in the top jaw 12. The slot rim protrusions 22 of the base jaw 6 fit into the lateral slots 24 below the slot protrusions 26 of the top jaw 12. The slot rim protrusions 26 of the top jaw 12 fit into the lateral slots 20 below the slot rim protrusions 22 of the base jaw 6.

On their bottom side bounding the associated lateral slot 20, the slot rim protrusions 22 of the base jaw 6 each are fitted with an engaging surface 28 that according to the wedge angle a of the wedge rib 16-1 (and/or 16-2) are configured obliquely in V-shaped manner to each other.

On their bottom side bounding the associated lateral slot 24, the slot rim protrusions 26 of the top jaw 12 each are fitted with an engaging surface 30 that are configured in V-shaped wedge manner to each other at the same wedge angle as the wedge slot 18. The wedge angle a is the same for both the base jaw 6 and the top jaw 12 and is shown in FIGS. 3 and 4. The engaging surfaces 28 and 30 being configured in mutually V-wedge shape relative to each other, together do limit the mutual depth of engagement of the two jaws 6 and 12.

The wedge angle a is selected large enough to assure that no or only small jamming by wedging may arise, whereby the top jaw 12 and the base jaw 6 are easily plugged into each other and also can be easily separated. The wedge angle a therefore shall be at least 85°, preferably 90° or more, though at most 140°.

The apex 32 of the wedge angle a preferably points in the same radial direction as the clamping surface 14 of the top jaw 12. As a result, the mutually abutting engaging surfaces 28 of the base jaw 6 and 30 of the top jaw 12 will not be forced apart by the chuck's clamping forces when clamping a tool or a workpiece between the clamping surfaces 14 of several top jaws 12, but instead are forced against each other. Hence no play arises between the base jaws 6 and the top jaws 12. By avoiding play and the ensuing displacements between the base and top jaws, tools and workpieces can be positioned very accurately and in play-free manner between the clamping surfaces 14.

The two engaging surfaces 28 of the base jaw 6 are denoted in FIGS. 3 as 28-1 and 28-2. The two engaging surfaces 30 of the top jaw 12 are denoted as 30-1 and 30-2 in FIG. 4.

In the preferred embodiment mode of the invention, namely the one shown in the drawings, each base jaw 6 is fitted with two identical but radially oppositely pointing plug-in elements each in the form of two laterally undercut wedge ribs 16-1 and 16-2 (or laterally undercut wedge slots when the associated top jaw 12 is fitted with a wedge rib instead of a wedge slot). In the preferred embodiment mode, the wedge ribs 16-1 and 16-2 comprise radially opposite wedge angles α and α2 which are associated to each other, preferably being subtended at a double wedge head element 16. The head element 16 comprises an inwardly pointing end fitted with the above lateral slots 20 which are configured in mutual cuneal manner and are denoted by 20-1 and 20-2 in FIG. 3, and said head element further comprises the slot rim protrusions 22 bounding said lateral slots and represented in FIG. 3 by 22-1 and 22-2. Radially thereto there run lateral slots 20 which also are configured in wedge shape manner and the slot rim protrusions 22 externally bounding said slots 20. In FIG. 3 the lateral slots 20 are denoted by 20-3 and 20-4 and the slot rim protrusions 22 by 22-3 and 22-4. The wedge angle of both wedge ribs 16-1 and 16-2 may be different through preferably it shall be identical even though each time pointing in the opposite direction. The wedge angle of the radially outwardly pointing wedge rib 16-2 is denoted by α2 in FIG. 3. Its angle apex is denoted by 32-2.

As a result, it is feasible to connect the top jaws 12 as shown in the drawings radially from the inside to the outside to the base jaws 6 as regards the external clamping of tools or workpieces, or to rotate the top jaws 12 by 180° and then plug them from the outside to the inside onto the base jaws 6 as regards the inner clamping of tools or workpieces. In the latter case, underneath the slot rim protrusions 22-3 and 22-4, the slot rim protrusions 26 of the top jaw 12 engage the lateral slots 20-3 respectively 20-4 of the base jaw 6.

In FIG. 4 the two slot rim protrusions 26 configured in cuneal manner are denoted by 26-1 and 26-2. The lateral slots 24 mutually configured in cuneal manner are denoted by 24-1 and 24-2 in FIG. 4.

The width of the wedge ribs 16-1 and 16-2 and that of the wedge slot 18 may run in theory in arbitrary directions, though in the preferred embodiment of the invention such a width shall run in a plane which is orthogonal to the theoretical central longitudinal axis 8. Preferably at the front end face of the wedge rib head element 16, the base jaw 6 is fitted, with an end-face positioning surface 40 which extends in a plane radial to the longitudinal axis 8.

The top jaw 12 comprises an end-face positioning surface 42 extending in a plane radial to the longitudinal axis 8 and preferably being an extension of the bottom surface 43 of the wedge slot 18.

As a result, the top jaws 12 and the base jaws 6 may be moved toward each other in the longitudinal direction of the longitudinal axis 8 until the positioning surfaces 40 of the base jaws rest on the positioning surfaces 42 of the top jaws 12 whereas the wedge rib 16-1 (or 16-2) and the wedge slot 18 assume mutually radially-apart positions. Thereupon and by radially adjusting the base jaw 6, the wedge rib 16-1 (or 16-2) can be made to radially engage the wedge slot 18 of the top jaws 12, the end-face positioning surfaces 40 of the base jaws being slidable on the end-face positioning surfaces 42 of the top jaws 12. The base jaw displacement unit 9 conventionally present in the chuck is used to radially displace the base jaws 6 but on account of its public knowledge such a displacement unit 9 is not shown in detail herein.

In the preferred embodiment of the invention, the engaging surfaces 28 of the wedge ribs 16-1 and 16-2 are configured to be oblique toward the bottom of the lateral slots 28 and thereby also oblique to a radial transverse plane of the longitudinal axis. The engaging surfaces 30 of the top jaws 12 in this respect are configured parallel in the direction to the bottom of the lateral slots 24 and hence also obliquely down to a radial transverse plane of the longitudinal axis 8. As a result, when plugging together the base jaws 6 and the top jaws 12, the said engaging surfaces 28 of the base jaws 6 are displaced onto the engaging surfaces 30 of the top jaws 12 and thereby the end-face positioning surfaces 42 of the top jaws 12 will be clamped against the end-face positioning surfaces 40 of the base jaws 6.

In another embodiment mode of the invention, the engaging surfaces may be constituted by the slot rim protrusions of the lateral slots 20 and 24.

In one preferred embodiment mode of the invention, at least one of the two jaws, namely the base jaw 6 and the top jaw 12, preferably in accordance with the drawings, the base jaw 6, is fitted with a locking bolt 48 mounted in a guide borehole 50 and displaceable parallel to the longitudinal axis 8, said bolt being partly expelled by a compression spring 52 out of the guide bore into a locking position shown in FIG. 2. The excursion of the locking bolt 48 is limited by a stop pin 54. Preferably the guide borehole 50 is configured in the end-face positioning surface 40 of the base jaw 6. As a result the locking bolt 48 projects from this positioning surface only when in the locked position.

Preferably a key, or a manually key-activated drive cylinder 56, shall be used, whereby the locking bolt 48 can be manually moved against the force of the compression spring 52 from the locked position into an unlocked position in the guide bore 50. The key or drive cylinder 56 is guided within a key guide borehole 57 of the base jaw 6 and comprises a bolt 60 which is excentric to the key axis 58, said bolt 60 being insertable into a borehole 62 of the locking bolt 48. Moreover it is feasible both as regards the identical embodiment mode of the shown drawings or another embodiment mode lacking manual operability to automatically drive the locking bolt 48 by a jaw exchanging device against the force of the compression spring 52.

When in its locked position, the locking bolt 48 may extend within a locking borehole 64 of the top jaw 12 and thereby lock the top jaw 12 to the base jaw 6 as indicated in FIG. 5. While in its locked position, the locking bolt 48 may absorb radial forces between the two jaws 6 and 12, said radial forces however will being unable to move it back into its unlocked position. The locking borehole 64 is constituted in the end-face positioning surface 42 of the top jaw 12. Preferably the locking borehole 64 runs through the entire top jaw 12, allowing inserting a positioning bolt 78 into it from the other jaw side.

In a further embodiment of the invention, the base jaw 6 is fitted with at least one or preferably with two spring-loaded inhibiting elements 70 that, due to the spring force applied by an omitted spring element, project from the positioning surface 40 and enter oppositely situated recesses in the top jaw 12 when the base jaw 6 and the top jaw 12 reach their plugged-in position shown in FIGS. 5 and 6. As a result said inhibiting elements 70 preclude the top jaw 12 from unintentionally skidding off the base jaw 6 when the locking bolt 48 illustratively is kept by the key 56 in the unlocked position.

Preferably the recesses 72 are situated in the positioning surface 42 of the top jaw 12. Said positioning surface 42 forces the inhibiting elements 70 back against the spring force so far that the positioning surface 42 of the top jaw 12 can rest on the positioning surface 40 of the base jaw 6 when the two jaws 6 and 12 are made to come near each other in the longitudinal direction of the longitudinal axis 8 while being sufficiently offset radially from each other that the locking bolt 48 shall be offset from the locking borehole 64. This condition is shown in FIG. 7. In this radially offset position, the positioning surface 42 of the top jaw 12 drives the inhibiting elements 70 and also the locking bolt 48 against their spring forces back into the base jaw 12.

If thereupon the base jaw 6 is displaced radially in order to be radially plugged together with the top jaw 12, said inhibiting elements 70 enter the clearances 72 and the locking bolt 48 enters the locking borehole 64 after the two jaws 6 and 12 have been completely assembled.

If thereupon the locking bolt 48 is moved back again into its unlocked position, then the base jaw 6 can be moved back radially relative to the top jaw 12 by the omitted adjustment unit of the power chuck, the inhibiting elements 70 being expelled from the recesses 72 during this procedure.

Preferably the inhibiting elements 70 are pins or balls projecting from one end of a sleeve 74 receiving a spring element. Such spring-loaded inhibiting elements 70, 74 are known.

The invention allows and enables simultaneously exchanging, both manually and automatically, a single or several or all top jaws 12.

An appropriate and preferred jaw exchanging device 75 comprises a top jaw exchanging component, preferably a top jaw exchange plate 76. The exchange plate 76 is fitted with a number of positioning bolts 78 corresponding to the number of base jaws 6 of the chuck 2, correspondingly distributed, said positioning bolts 78 projecting from one side of said plate in axially parallel manner toward the power chuck and receiving in plug-in manner each one top jaw 12 with its locking borehole 64. Depending on the shape of the top jaw 12, and as needed, a spacer sleeve 80 can be plugged onto the positioning bolts 78.

When not exchanging a top jaw 12, the said exchange plate 76 is situated in a basic position removed at a distance so far from the power chuck 2 that same is able to receive a tool or a workpiece and that work then can be done with said tool or on said workpiece.

To affix, exchange and remove top jaws 12 to or from the base jaws 6, the exchange plate 76 is moved, preferably by means of a transfer motion, transversely to the longitudinal axis 8, from the basic position or from a loading position into an axially-apart position. In this axially-apart position, the positioning bolts 78 are aligned in defined manner with the base jaws 6 and the axial separation is large enough to allow radially displacing the base jaws 6 without touching top jaws present on the exchange plate, and without top jaws 12 present on the base jaws 6 touching the positioning bolts 78. The defined axial alignment is such that subsequently the base jaws 6 can be moved due to axial displacement of the power chuck 2 (or the top jaws 12 due to an axial displacement of the exchange plate 76) from the axially-apart position into an axially abutting contact position. In the contact position the top jaws 12 rest by their end-face positioning surface 42 each on the oppositely situated positioning surface 40 of the base jaws 6, and the cuneal plug-in connector element 18 of the top jaws 12 is radially situated opposite the cuneal plug-in connector element 16-1 (or 16-2) of the base jaws 6 in such manner that they radially plug into one another or be radially unplugged from one another by means of a radial displacement of the base jaws 6 (or of the top jaws 12).

One embodiment mode of the invention comprises a transfer unit 81, for instance a conveyor belt, which is mounted underneath the power chuck 2 having a vertical longitudinal axis 8, to use said belt to equip said chuck with tools or workpieces. Said tools or workpieces are mounted into the power chuck 2 and, following a work procedure, are deposited again on said transfer unit 81. The same transfer unit 81 also may move top jaws 12 to and from the axially-apart position. In this procedure the exchange plate 76 may be set at a loading station on the transfer unit 81 and it may be removed subsequently from said unit at an unloading station. In this case the transfer unit 81 also is part of the jaw exchanging device 75 automatically affixing, removing or exchanging the top jaws 12 on/off the base jaws 6.

In other embodiment modes of the invention, the jaw exchanging device 75 also may exhibit a different design, for instance being a robot to position the top jaw exchange plate 76 or to position the top jaws 12 in the absence of an exchange plate.

Operation of the machine constituted by the power chuck 2 and the jaw exchanging device 75 is discussed below.

In FIG. 5, the base jaws 6 (only one being shown) are affixed to the top jaws 12 (only one being shown). This is the plug-in connection position. An empty exchange plate 76 already was moved into an axially-apart position opposite the power chuck 2 and was positioned in the direction of rotation in a manner that each positioning bolt 78 of a locking borehole 64 of is now opposite to, and at an axial distance from, a locking borehole 64 of the associated top jaw 12.

For the condition shown in FIG. 6, the power chuck 2 was lowered enough that the positioning bolt 78 has entered the locking borehole 64 of the top jaw 12 and thereby has expelled the locking bolt 48 from said borehole. By being lowered, the power chuck 2 did reach the so-called axial contact position.

Presently the base jaw 6 can be displaced so far radially outward by means of the bas jaw displacement unit 9 conventionally present in the power chuck case 4 that the radial plug-in connection between the wedge slot 18 and the wedge rib 16-1 has been disengaged.

This radially disengaged position is shown in FIG. 7 and is situated in the axial contact position. During this radial displacement, the inhibiting elements 70 are expelled from the recesses 72 and, jointly with locking bolts 48, they slide on the end-face positioning surface 42 of the top jaw 12. This disengaged position when disengaging the base jaws 6 from the top jaws 12 represents a plug-in readiness position as the base jaws 6 are plugged into the top jaws 12.

Once the two jaws 6 and 12 have been disengaged radially, they also may be disengaged axially by raising the power chuck 2. FIG. 8 shows the axially separated base jaw 6 and top jaw 12 in the said axially-apart position.

The exchange plate 76 now can be moved from the axially-apart position shown in FIG. 8 into a basic position or a loading position that is farther removed from the power chuck 2 axially and/or radially. There the top jaws 12 may be exchanged against others. In the basic position, the loading position and preferably in the axially-apart position of FIG. 8, there is the feasibility to rotate the top jaws 12 or other top jaws on the exchange plate 76 by 1180° about the center axis 79 of the positioning bolts 78, whereby their wedge slot 18 points no longer radially outward but radially inward. Then the top jaw 12, being in this new position rotated by said 180°, can be plugged onto the radially outer wedge rib 16-2. In this case the clamping surfaces 14 point radially outward to receive a tool or workpiece to be clamped radially outward.

The above procedure is reversed to affix the top jaws 12 to the base jaws 6: the exchange plate 76 together with the top jaws 12 is moved into the position shown in FIG. 8. Then the power chuck 2 is lowered on the top jaws 12 as shown in FIG. 7. Next the base jaws 6 are radially displaced by the base jaw displacement unit 9 of the power chuck 2 and thereby they are plugged together radially with the top jaws 12 as indicated in FIG. 6. Thereupon the power chuck 2 is raised again together with the top jaws 12 plugged onto the base jaws 6 from the exchange plate 76 as shown in FIG. 5.

The exchange plate 76 may be fitted with lateral guide surfaces 82 to set the direction of rotation of the top jaws 12 on the positioning bolts 78.

FIG. 9 is a topview of the exchange plate 76 and its positioning bolts 78. The latter are situated on a circle 84 that is appropriate to position the jaws 6 and 12 when externally clamping tools and workpieces in the manner of FIGS. 2 through 8. The limited radial adjustability of the base jaws 6 may entail the need to position the top jaws along another circle, for instance one larger than the circle 84, and hence an outer circle 86, when the top jaws 12 having been rotated by 180° are deposited on the radially outward pointing wedge ribs 16-2 (FIG. 3). In this case the exchange plate 76 may be fitted with an additional number of positioning bolts 78-2, corresponding to the number of base jaws 6, along this other, i.e. outer circle 86.

FIG. 10 shows the power chuck 2 comprising a key 90 to manually displace the locking bolt 48 against the force of its compression spring 52 from the locked into the unlocked position.

The wedge angle α and α2 is between 85 and 140°, preferably between 88 and 100°, and even more preferably between 89 and 91°, and in the most preferred embodiment mode being 90°.

The angle center line of the wedge angle always is situated along the displacement path 10 of the base jaws 6.

The invention claimed is:

1. A base jaw and a top jaw of an implement holding device, said jaws allowing plug-in connection along a rectilinear displacement path and being fitted for that purpose with a cuneal plug-in connector having engaging surfaces configured at a defined wedge angle relative to one another; the top jaw comprising at least one clamping surface pointing in a clamping direction to clamp a tool or a workpiece, the said clamping direction running along the rectilinear displacement path; one of the said jaws comprising at least one plug connector element which is fitted with a wedge rib having an undercut on both sides of the wedge, and the other jaw comprising at least one plug-in connector element fitted with a wedge slot and being open on both wedge sides at its wider slot end to allow inserting the wedge rib; where, due to the undercuts each jaw comprises on each wedge side a lateral slot and a slot rim protrusion, and at least one of the engaging surfaces is constituted in each lateral slot; the slot rim protrusions of the two jaws being made to fit into the lateral slots of the associated other jaw and their engaging surfaces are configured in mutually oblique manner in relation to the wedge angle bounding the depth of engagement of the two jaws when being plugged together, wherein the wedge angle is at least 85° or larger but at most 140°, and the wedge angle apex points in the same radial direction as the clamping surface.

2. Base jaw and top jaw as claimed in claim 1, wherein the wedge angle is between 88° and 100°.

3. Base jaw and top jaw as claimed in claim 2, wherein the wedge angle is between 89° and 91°.

4. Base jaw and top jaw as claimed in claim 1, wherein the base jaw comprises at least one wedge rib and in that the top jaw is fitted with at least one matching wedge slot.

5. Base jaw and top jaw as claimed in claim 1, wherein the base jaw comprises at least two of the claimed cuneal plug-in connector element, both plug-in connector elements exhibiting the claimed features, however being configured along the rectilinear displacement path at opposite end zones of the base jaw and by their angle apices pointing radially in opposite directions.

6. Base jaw and top jaw as claimed in claim 5, wherein both plug-in connector elements of the base jaw are identical in a manner that the top jaw can be connected in one direction by its plug-in connector element to a plug-in connector element of the base jaw or, when rotated by 180°, being connected by its plug-in connector element to the associated other plug-in connector element of the base jaw.

7. Base jaw and top jaw as claimed in claim 1, wherein at least one of said jaws is fitted with at least one locking bolt displaceable between an unlocked, recessed position in said jaw and out of this jaw on one hand and a locked position in a locking aperture of the associated other jaw on the other hand, the two plugged-together jaws being mutually clamped in said locked position and the locking bolt being disengaged only by means of an additional disengaging element, not by forces applied by the two jaws.

8. Base jaw and a top jaw as claimed in claim 1, wherein at least one of the jaws is fitted with an inhibiting element which is spring-loaded to partly project from an end-face surface of this jaw and which can be forced by the associated other jaw into the end-face surface, in that the associated other jaw is fitted with a recess that shall be opposite the inhibiting element when said element is able to enter the recess and then will prevent the two jaws from coming apart when the two jaws have been fully plugged into one another, in that however the inhibiting element can be forced back by the associated other jaw into the end-face surface of the one jaw by joining the two jaws or by means of an externally applied force that forces the two jaws apart in the direction of disengagement while applying a predetermined minimum force.

9. An implement clamping system, comprising at least one base jaw and at least one associated top jaw as claimed in claim 1.

10. A base jaw and a top jaw of an implement holding device, said jaws allowing plug-in connection along a rectilinear displacement path and being fitted for that purpose with a cuneal plug-in connector having engaging surfaces configured at a defined wedge angle relative to one another; the top jaw comprising at least one clamping surface pointing in a clamping direction to clamp a tool or a workpiece, the said clamping direction running along the rectilinear displacement path; one of the said jaws comprising at least one plug connector element which is fitted with a wedge rib having an undercut on both sides of the wedge, and the other jaw comprising at least one plug-in connector element fitted with a wedge slot and being open on both wedge sides at its wider slot end to allow inserting the wedge rib; where, due to the undercuts each jaw comprises on each wedge side a lateral slot and a slot rim protrusion, and at least one of the engaging surfaces is constituted in each lateral slot; the slot rim protrusions of the two jaws being made to fit into the lateral slots of the associated other jaw and their engaging surfaces are configured in mutually oblique manner in relation to the wedge angle bounding the depth of engagement of the two jaws when being plugged together, wherein the wedge angle is at least 85° or larger but at most 140°, wherein the two jaws each comprise at least one end-face positioning surface which is constituted in mutually opposite manner in a direction transverse to the rectilinear displacement path, the end-face positioning surface of one jaw being opposite the end-face positioning surface of the other jaw and these positioning surfaces always abutting one another when the wedge rib is out of the wedge slot, however the two jaws being positioned in such manner that the wedge rib can be plugged into the wedge slot along the rectilinear displacement path.

11. Base jaw and top jaw as claimed in claim 10, wherein the engaging surfaces are beveled toward the bottom of the lateral slots to allow displacing the two jaws onto each other when they are being plugged together and as a result the two jaws are drawn together, whereby the positioning surfaces of the two jaws are clamped together.

12. Base jaw and top jaw as claimed in claim 10, wherein the end-face positioning surfaces are constituted at the two jaws at least partly outside the undercut and are configured relative to the wedge rib and to the wedge slot in a manner that the two jaws can be deposited on each other by means of their end-face positioning surface in a first step and then in a second step while sliding on the end-face positioning surfaces, they can be plugged together at the wedge rib and the wedge slot.

13. Base jaw and top jaw as claimed in claim 10, wherein the end-face positioning surface of the jaw fitted with the wedge rib is an end face on the wedge rib and in that the end-face positioning surface of the jaw fitted with the wedge slot is an extension of the bottom of the wedge slot.

14. A machine, comprising the jaws of claim 10, further comprising a jaw exchanging device to automatically exchange the top jaws with new top jaws at the base jaws, the base jaws and the top jaws being superposable at their end-face positioning surfaces and the base jaws being displaceable relative to the top jaws and in this process sliding one on the other at their positioning surfaces in order to plug together the base jaws and the top jaws or to disengage them.

* * * * *